(12) United States Patent
Takata et al.

(10) Patent No.: US 7,175,721 B2
(45) Date of Patent: Feb. 13, 2007

(54) METHOD FOR PREPARING CR-TI-V TYPE HYDROGEN OCCLUSION ALLOY

(75) Inventors: Hiroaki Takata, Hyogo (JP); Yutaka Oka, Hyogo (JP); Junichi Nakagawa, Hyogo (JP); Akira Neoda, Kyoto (JP)

(73) Assignee: Santoku Corporation, Hyogo (JP)

( * ) Notice: Subject to any disclaimer, the term of this patent is extended or adjusted under 35 U.S.C. 154(b) by 0 days.

(21) Appl. No.: 10/476,070

(22) PCT Filed: Apr. 25, 2002

(86) PCT No.: PCT/JP02/04129

§ 371 (c)(1),
(2), (4) Date: Oct. 24, 2003

(87) PCT Pub. No.: WO02/088405

PCT Pub. Date: Nov. 7, 2002

(65) Prior Publication Data

US 2004/0134308 A1    Jul. 15, 2004

(30) Foreign Application Priority Data

Apr. 27, 2001  (JP) .............................. 2001-132799
Aug. 21, 2001  (JP) .............................. 2001-250225

(51) Int. Cl.
*C22C 14/00*   (2006.01)
*C22C 1/02*    (2006.01)
*C22F 1/18*    (2006.01)
*C22F 1/16*    (2006.01)

(52) U.S. Cl. ...................... 148/538; 148/559; 148/668; 148/669; 420/417; 420/418; 420/420; 420/421; 420/428

(58) Field of Classification Search ................ 148/538, 148/668–671, 559; 420/420–421, 417–148, 420/582–583, 428
See application file for complete search history.

(56) References Cited

U.S. PATENT DOCUMENTS 5,002,730 A    3/1991    Fetcenko (Continued)

FOREIGN PATENT DOCUMENTS

JP    58-090350 A1    5/1983

(Continued)

*Primary Examiner*—Roy King
*Assistant Examiner*—Lois Zheng
(74) *Attorney, Agent, or Firm*—Darby & Darby (57) ABSTRACT

The invention relates to a method for producing high-performance Cr—Ti—V hydrogen storage alloys utilizing a thermit process, whereby residence of adversely affecting impurities is inhibited, addition of not less than 10 at % of Ti as an alloy component is realized, and thermal burden on the crucible used in the method is reduced. The method includes the steps of: (A) providing an alloy material (1) comprising a Cr oxide, a V oxide, and a reducing agent Al, and an alloy material (2) comprising Ti; (B) placing the alloy materials in a crucible for thermit reduction so that the alloy material (1) is placed above the alloy material (2); (C) igniting the alloy material (1) placed in step (B) and melting all metal elements contained in the alloy materials the with heat of the thermit reaction of the alloy material (1); and (D) making the alloy melt obtained in step (C) into an alloy.

19 Claims, 2 Drawing Sheets

U.S. PATENT DOCUMENTS

5,490,970 A * 2/1996 Gamo et al. ................. 420/424
2002/0179196 A1* 12/2002 Okada et al. ............... 148/421
2004/0037733 A1* 2/2004 Oka ........................... 420/428

FOREIGN PATENT DOCUMENTS

| JP | 63-186835 A1 | 8/1988 |
| JP | 02-179837 | * 12/1990 |
| JP | 04-041628 A1 | 2/1992 |
| JP | 11-106859 A1 | 4/1999 |
| JP | 2000-096160 A1 | 4/2000 |

* cited by examiner

METHOD FOR PREPARING CR-TI-V TYPE HYDROGEN OCCLUSION ALLOY

FIELD OF ART

The present invention relates to a method for producing hydrogen storage alloys having excellent hydrogen storage performance, in particular, a method for producing Cr—Ti—V hydrogen storage alloys used for storage and transportation of hydrogen, negative electrodes for rechargeable batteries, or heat pumps.

BACKGROUND ART

Hydrogen storage alloys have been manufactured in a drastically increasing amount since the alloys were used for anodes of batteries. The hydrogen storage alloys presently used for batteries are mostly $AB_5$, type alloys, which contain La or misch metal, a mixture of light rare earth elements, on the A-site, and Ni on the B-site, which is partially substituted by Co, Mn, Al, or the like element. The amount of hydrogen that such $AB_5$ type alloys are capable of absorbing and desorbing under the hydrogen pressure of 0.01 to 4 MPa (defined as effective hydrogen storage capacity) is at most 1.2 wt %. When the alloy having such an effective hydrogen storage capacity is used for producing a hydrogen storage tank mounted on a fuel cell electric vehicle, which is under active development, the required amount of the alloy weighs too much. In order to overcome this drawback, Cr—Ti—V alloys principally of a body-centered cubic crystal structure (BCC structure) are recently under development as a different line of hydrogen storage alloys, which have an effective hydrogen storage capacity of over 2 wt %.

Cr—Ti—V alloys have excellent properties, but require higher temperatures in their production for melting the essential elements V and Cr for alloying, which have melting points of 1910° C. and 1863° C., respectively. In addition, Ti, which also has a melting point of as high as 1670° C., is an active element, and thus requires careful selection of a crucible in which it is melted. That is, if a Cr—Ti—V alloy is melted in a crucible made of a metal oxide such as alumina, magnesia, or zirconia, Ti reacts with the main component of the crucible to corrode the walls of the crucible, which are cracked and become unusable for melting. Thus in practice, alloys containing active Ti with a high melting point are merely under pilot production by arc melting in a water-cooled copper crucible. However, in melting an alloy in a water-cooled copper crucible, the portion of the alloy melt that is in contact with the crucible is not melted, which leads to segregation and poor thermal efficiency. Thus this method is not suitable for mass-production.

It is known that the reaction of Ti with an oxide crucible becomes severer as the temperature increases. Thus, the burden to the crucible may be alleviated if the melting point of the master alloy is lowered. In this regard, JP-9-49034-A discloses a method for producing a BCC hydrogen storage alloy containing at least V and Ni, in which a V—Ni, Ti—V, or Fe—V alloy produced by thermit reduction is used as a starting material. JP-2000-96160-A discloses a method for producing a material for a V-containing hydrogen storage alloy having the Al content of less than 1 wt % by thermit reduction of an alloy material containing V-oxide and optionally Ni, Fe, Cu, Co, Mn, Cr, Nb, Ta, and the like element, using Al or an Al alloy as a reducing agent. JP-11-106847-A discloses a method for reducing the oxygen content of a V-containing hydrogen storage alloy produced by thermit reduction, wherein the alloy is melted under heating with a deoxidizing agent such as Ca, Mg, rare earth elements, or the like, for improving the properties of the alloy.

As can be seen from these methods, production methods are being developed which employ alloys of V and a transition metal as a master alloy of a hydrogen storage alloy, instead of metal V, which is high in both melting point and cost. Also the thermit reduction is recognized as a favorable method for mass-production, compared to the above-mentioned arc melting in a water-cooled copper crucible.

In producing a Cr—Ti—V hydrogen storage alloy, however, when a Ti oxide and a V oxide are reduced with metal Al by thermit reaction for obtaining a Ti—V alloy in accordance with the method disclosed in JP-9-49034-A, the Ti oxide cannot be reduced sufficiently with Al, so that a large amount of Al remains in the resulting alloy, in particular in producing an alloy having the Ti content of not lower than 10 at %. Such an alloy containing an excess amount of Al has a remarkably low hydrogen storage capacity, and cannot achieve the effective hydrogen storage capacity of not lower than 2 wt %.

In order to overcome this problem, JP-2000-96160-A discloses to use, as a reducing agent, 85 to 99% of the theoretical amount of Al required for reducing all the oxides in the alloy material, in order to reduce the Al content in the resulting alloy to not higher than 1 wt %. However, when this method is applied to production of a Cr—Ti—V alloy, the Cr—V alloy produced by thermit reduction has to be remelted before Ti is added. For remelting, the Cr—V alloy has to be heated to as high as not lower than 1750° C., which severe temperature condition remarkably impairs the life of the crucible. Further in this method, wherein the amount of the reducing agent Al is lowered below its theoretical amount for lowering the residual Al content to not higher than 1 wt %, enough heat is not generated in the reducing reaction when the Al content is not higher than 95%, in particular not higher than 90% of the theoretical amount. This makes it difficult to maintain the alloy melt at a required high temperature for a required duration, which results in insufficient separation of the oxides from the alloy melt by floating.

In the above-described prior art, no method has been established that realizes intensive production of a high-purity, multi-element alloy containing V, utilizing thermit reduction, without remarkably impairing the service life of an expensive crucible. In particular for production of the alloy also containing Ti as an essential element, V produced by thermit reduction or an alloy of V and other alloy elements than Ti has to be the master alloy, to which metal Ti is added, and remelted at a high temperature. This inevitably involves additional consumption of thermal energy and wearing of the crucible.

SUMMARY OF THE INVENTION

It is therefore an object of the present invention to provide an effective method for producing a high-performance Cr—Ti—V hydrogen storage alloy by thermit process, whereby residence of adversely-affecting impurities such as Al is inhibited, addition of not less than 10 at % of Ti as an alloy component is realized, and thermal burden on the crucible used in the method is reduced.

According to the present invention, there is provided a method for producing a Cr—Ti—V hydrogen storage alloy utilizing thermit process comprising:

material preparation step (A) of providing an alloy material (1) comprising a Cr oxide, a V oxide, and a reducing agent Al, and an alloy material (2) comprising Ti;

material introduction step (B) of placing said alloy materials in a crucible for thermit reduction so that the alloy material (1) is placed above the alloy material (2);

metal melting step (C) of igniting the alloy material (1) placed in the crucible in step (B) for thermit reaction and melting all metal elements contained in the alloy materials with heat of the thermit reaction of the alloy material (1) to obtain an alloy melt; and step (D) of making said alloy melt obtained in step (C) into an alloy.

PREFERRED EMBODIMENTS OF THE INVENTION

The present invention will now be explained in detail.

The method of the present invention utilizes thermit process, and includes as the first step the material preparation step (A), wherein an alloy material (1) containing a Cr oxide, a V oxide, and a reducing agent Al, and an alloy material (2) containing Ti, are provided.

In step (A), Al contained in the alloy material (1) may be metal Al and/or an Al alloy. Al acts as a reducing agent for the Cr oxide, the V oxide, and an oxidizing agent optionally contained in the alloy material (1).

The Al alloy may be any alloy as long as it contains an effective amount of Al for thermit reaction of the present invention, and as long as the kinds and amounts of the alloy elements do not have adverse effects on the performance of the resulting hydrogen storage alloy even if included therein. Examples of the Al alloy may include Al—Si alloys, Al—Mg alloys, Al—Si—Cu alloys, alloys for Al castings, Al alloys distributed in the market as die-cast alloys, and scraps thereof. Use of Al as a reducing agent reduces the production cost.

The alloy material (1) may contain an oxidizing agent for providing additional heat by thermit reaction. This oxidizing agent functions to provide supplemental heat in addition to the heat generated by the thermit reaction of the essential components, so that the addition of the oxidizing agent may reduce the content of the reducing agent Al. Preferred oxidizing agents are those generate a large amount of heat upon oxidation-reduction reaction with Al, such as barium peroxide ($BaO_2$), potassium chlorate ($KClO_3$), and sodium chlorate ($NaClO_3$). For example, the amount of heat generated by reduction of potassium chlorate with Al is as large as 3.16 times the amount of heat generated by reduction of chromic oxide with Al, and 2.32 times the amount of heat generated by reduction of vanadium oxide with Al (Denki Kagaku Binran, 4th edition, Maruzen) With such amount of heat being provided, the overall temperature of the alloy materials (1) and (2) maybe raised sufficiently to promote floating and separation of the slag from the alloy melt, and thus a clean alloy may be obtained.

The amount of the oxidizing agent to be added may suitably be decided in accordance with the amount obtained from the sum of the amount of heat in need due to the Al content reduced from the theoretical amount for reducing the starting oxide materials and the amount of heat escaping from the walls of the crucible, divided by the amount of heat generated by reduction of the oxidizing agent.

In step (A), the content of Al as the reducing agent may be the amount required for reducing the Cr oxide and the V oxide, and when the oxidizing agent is contained in the alloy material (1), the sum of 70 to 90% of the theoretical amount required for reducing the Cr oxide and the V oxide and the amount required for reducing the oxidizing agent. This Al content has been decided based on the experimental data discussed below.

Experiments in thermit reduction were conducted using starting materials containing six different amounts of Al powders ranging from 3.87 kg (70% of the theoretical amount) to 4.84 kg (100% of the theoretical amount), with respect to 3.0 kg of vanadium oxide and 9.0 kg of chromium oxide.

Figure 1:
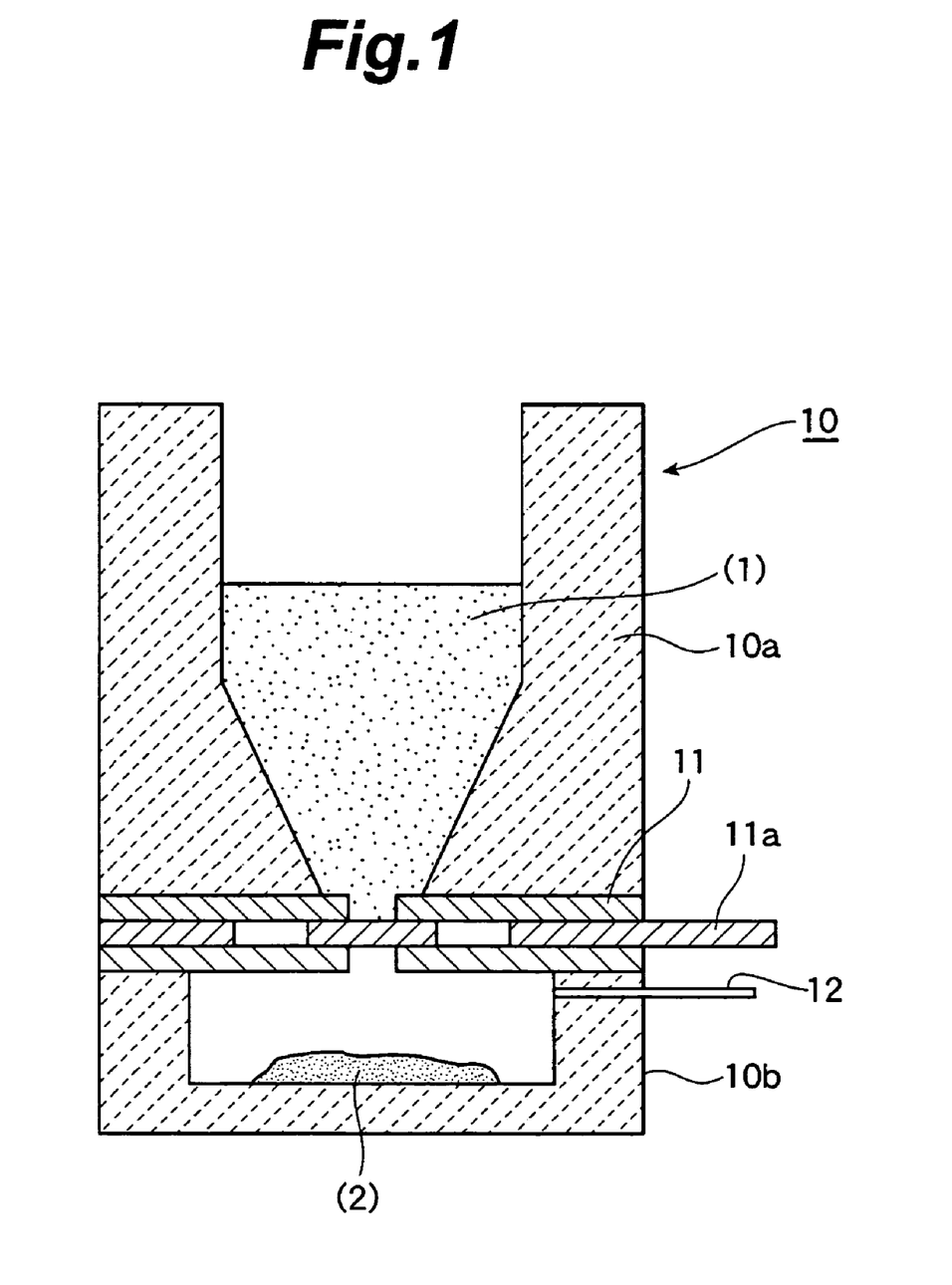
FIG. 1 is a schematic view of an apparatus that may be used in the method of the present invention, provided for explaining experiments for deciding an Al content for the invention.

In the experiments, crucible 10 for thermit reaction was used, composed of refractory bricks 10a and 10b as shown in FIG. 1. Above the separator plate 11 having sliding nozzle 11a of the crucible 10 was placed the alloy material (1) containing the above starting materials and 1.0 kg of potassium chlorate as the oxidizing agent and 440 g of Al powders as the reducing agent therefor. Below the plate 11 was placed 3.4 kg of sponge titanium as the alloy material (2) as shown in the figure. With an argon gas blowing in through gas supply conduit 12, the alloy material (1) was ignited on top to initiate thermit reaction. When the alloy in the alloy material (1) was in a molten state, the sliding nozzle 11a was slid open to pour the alloy melt onto the alloy material (2). After cooling, the obtained alloy was taken out of the lower furnace, and the aluminum content of the alloy was analyzed.

Figure 2:
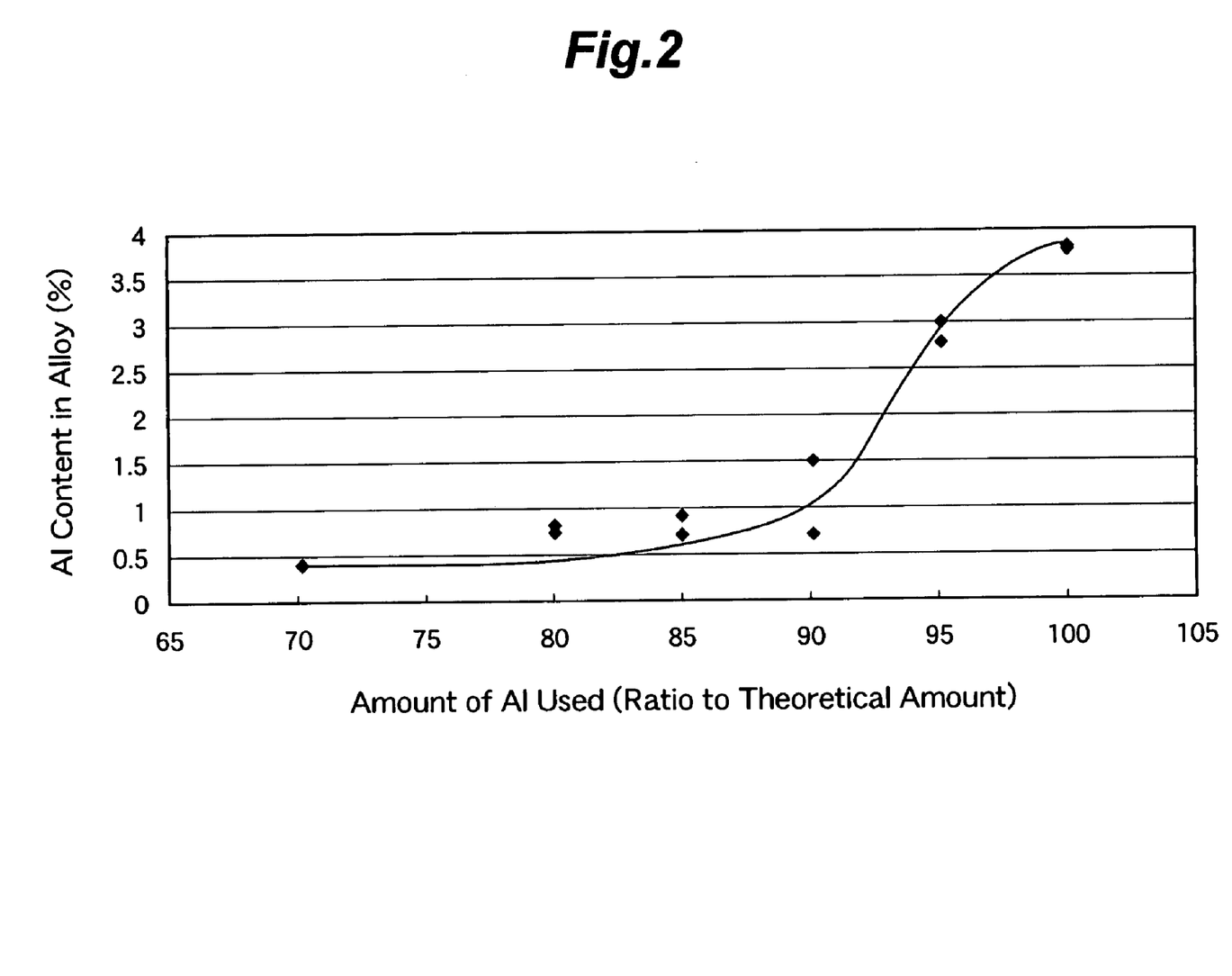
FIG. 2 is a graph showing the results of the experiments for deciding an Al content for the present invention, illustrating the relationship between the ratio of the Al content to the theoretical amount and the Al content in the Cr—Ti—V alloy after reduction and cooling.

The relationship between the ratio of the Al amount used to the theoretical Al amount and the Al content in the Cr—Ti—V alloy after reduction and cooling is shown in FIG. 2. From the figure, it is observed that the Al content in the alloy cannot be lowered to below 1 wt % when the amount of Al used is not less than 95% of the theoretical amount required for the reduction. When the amount of Al used is less than 70% of the theoretical amount, the yield of the Cr—Ti—V alloy is lowered, which is not economical. Consequently, when the oxidizing agent is contained, the amount of Al for reducing the Cr oxide and the V oxide is decided to be 70 to 90% of the theoretical amount thereof acting as the reducing agent for these oxides.

The alloy materials (1) and (2) prepared in step (A) may optionally contain an auxiliary component, in addition to the above components. Examples of the auxiliary component may include Fe, Mn, Mo, Ni, Co, and mixtures thereof. The content of each auxiliary component is preferably 0.01 to 5.0 at %. Fe and Mn each increases the hydrogen storage capacity in only a small amount, which effect, however, cannot be obtained in an amount of less than 0.01 at %. In an amount of over 5.0 at %, the hydrogen storage capacity may contrary be lowered. Mo stabilizes the BCC structure of the resulting Cr—Ti—V alloy, which effect, however, cannot be obtained in an amount of less than 0.01 at %. In an amount of over 5.0 at %, a secondary phase may appear and the hydrogen storage capacity may be lowered.

The auxiliary component may integrally be alloyed with other components upon thermit reaction, for example, by adding the auxiliary component in the form of metal or an alloy as a component of the alloy material (2), or by adding the auxiliary component in the form of an oxide as a component of the alloy material (1). In view of the controllability of the reaction, the former is preferred.

In step (A), each alloy material may contain other inevitable components in an amount that does not adversely affect the objects of the present invention. Each alloy material maybe prepared, for example, by suitable crushing into a suitable size so that the material may be placed in a crucible for thermit reduction.

According to the present method, next, material introduction step (B) is performed, wherein the alloy materials prepared in step (A) are placed in a crucible for thermit reduction so that the alloy material (1) is placed above the alloy material (2).

In step (B), the alloy materials (1) and (2) may be in any arrangement as long as the alloy material (1) is placed above the alloy material (2) so that the alloy material (1) melted as a result of ignition thereof for thermit reaction is brought into contact with the alloy material (2) in the crucible to melt the same. For example, the alloy materials (1) and (2) may be arranged in layers, or a separation layer or a separation member may be disposed between the alloy materials (1) and (2).

For efficiency of step (B), it is preferred to provide a separation layer or a separation member. The former may be a layer of, for example, metal thin plates, alloy thin plates, or an inorganic oxide, having a melting point higher than that of Al. The latter may preferably be, for example, a separator plate having a sliding nozzle and capable of separating the interior of the crucible into the upper and lower compartments, as shown in FIG. 1. Such a separation layer or a separation member may prevent the Al or the Al alloy, which is liquefied when the temperature exceeds its melting point in the beginning of the thermit reaction, from dripping through the oxides onto the alloy material (2) placed in the lower part of the furnace, without effectively acting as the reducing agent.

The separation layer may be made not only of metal but also an inorganic oxide, as long as the layer prevents the dripping of the liquefied Al or Al alloy. The thickness and shape of the separation layer may suitably be selected from those capable of providing the above effect. The thickness may preferably be 0.05 to 10 mm. The shape may be, for example, a plate, dish, or hat shape. Examples of a separation layer made of metal or alloy thin plates may include plates such as iron, steel, or alloy steel plates of usually 0.05 to 3.0 mm thick, or laminates of such plates. The laminates may be preferred for readiness of shaping of the boundary between the alloy materials (1) and (2) into a dish or the like shape. Examples of the inorganic oxide may include magnesia, zirconia, yttria, or mixtures thereof. These oxides, after acting as the separation layer, come to the alloy melt surface and protect the same. The separation layer may optionally contain the auxiliary component mentioned above.

The sliding nozzle and the separator plate used as the separation member may preferably be made of an oxide having high reduction resistance, such as of magnesia, zirconia, or yttria type. Operation of the sliding nozzle may include drawing of the nozzle to open the nozzle gate so that the alloy material (1) placed in the upper compartment partitioned by the separator plate and reduced and melted by the thermit process to be discussed later, is poured into the alloy material (2) placed in the lower compartment partitioned by the separator plate and shielded in advance with an inert gas such as argon.

According to the present method, next, metal melting step (C) is performed, wherein the alloy material (1) placed in the crucible in step (B) is ignited for thermit reaction, and, with heat of the thermit reaction of the alloy material (1), all metal elements contained in the alloy materials are melted to obtain an alloy melt.

By the ignition in step (C), thermit reaction is initiated, wherein the Cr oxide, the V oxide, and the optionally-contained oxidizing agent first react with Al, and a Cr—V alloy melt is produced at a temperature not lower than about 1800° C., while Al and the metal element in the oxidizing agent turns to an oxide. Due to a difference in specific gravity, the oxide migrates upwards and the hot Cr—V alloy migrates downwards. The Cr—V alloy migrating downwards immediately reacts with Ti or a Ti alloy in the alloy material (2) to produce a melt of a Cr—Ti—V alloy.

According to the present invention, step (D) is performed next, wherein the alloy melt prepared in step (C) is made into an alloy. Step (D) may be carried out by cooling the alloy melt.

The Cr—Ti—V alloy obtained by the method of the present invention may preferably contain 25 to 70 at % Cr, 15 to 45 at % Ti, 5 to 45 at % V, and 0.01 to 2 at % Al, and have a melting point of not higher than 1600° C. The mixing ratio of the alloy materials may be decided so that such an alloy is obtained. By controlling the melting point of the resulting Cr—Ti—V alloy to be not higher than 1600° C., burden on the crucible may be reduced upon remelting the alloy for deoxidation and casting in the following step to be discussed later, which makes it possible to use an oxide crucible, and to prolong the service life of the crucible. In sum, it is industrially significant and preferred to control the melting point of the Cr—Ti—V alloy to be not higher than 1600° C.

The reason for the preference of the above-mentioned alloy composition range is as follows. Increase in the V content not only results in increase in area of the BCC phase, but also results in rise in the melting point. Not lower than 5 at % of V content is required for industrially producing a BCC alloy, whereas not higher than 45 at % of V content is preferred for controlling the melting point of the resulting alloy to be not higher than 1600° C. Cr is an essential element for obtaining the BCC structure. With the Cr content of less than 25 at %, the hydrogen storage capacity is too low, whereas with the Cr content of over 70 at %, the melting point may exceed 1600° C. Ti is an essential element for a hydrogen storage alloy. With the Ti content of less than 15 at %, the hydrogen storage capacity is too low, whereas with the Ti content of over 45 at %, the ratio of the alloy material (1) is relatively decreased. In this case, sufficient heat is not generated by the thermit reaction of the alloy material (1) for effecting the reaction of a large amount of Ti, and accordingly the merit of the present invention may not be exploited.

In order to obtain an alloy having a melting point of not higher than 1600° C. and an effective hydrogen storage capacity of not lower than 2.0 wt %, the mixing ratio of the materials is preferably decided so that the Cr:Ti ratio is 1.0:1.0 to 2.0. When the Al content is over 2 at %, the hydrogen storage capacity is remarkably lowered, and when less than 0.01 at %, a large amount of nonmetallic inclusion resides in the resulting alloy, which may decrease the hydrogen storage capacity. Thus the preferred Al content is 0.01 to 1 at %.

According to the method of the present invention, the Cr—Ti—V alloy obtained through steps (A) to (D), when produced in an industrial scale, usually contains not less than 0.1 wt % of oxygen, which is generally known to decrease the hydrogen storage capacity of a hydrogen storage alloy. In the present invention, in order to ensure the objective hydrogen storage capacity of not lower than 2 wt %, it is preferred to incorporate into the method a deoxidizing step.

The method of the present invention may preferably include step (E) of melting the alloy obtained in step (D) with rare earth metal such as La, Ce, Mm, as a deoxidizing agent in an amount of not less than 0.2 at %, preferably 0.2 to 10 at % of the alloy; deoxidizing the alloy melt to lower its oxygen content to not higher than 0.1 wt % for lowering the oxygen content of the resulting alloy to not higher than 0.1 wt %; and cooling and solidifying the deoxidized alloy melt.

The melting in step (E) may be carried out, for example, in a high frequency induction furnace, an arc melting furnace, a plasma furnace, or an electron beam furnace. In step (E), when the alloy obtained in step (D) is a homogenous Cr—Ti—V alloy having a melting point of not higher than 1600° C., an oxide crucible may be used for remelting the alloy, such as those made of alumina, magnesia, zirconia, or yttria, and the crucible may be used repeatedly.

The cooling and solidifying of the deoxidized alloy melt in step (E) may be performed by a conventional method. When the cooling and solidifying is performed by a standard ingot casting method, a subsequent heat treatment is needed, wherein the ingot is coarsely crushed, heated at 1100 to 1450° C. for 1 minute to 1 hour, and rapidly cooled, in order to make as much of the main phase of the alloy structure as possible into a BCC single phase. On the other hand, when the cooling and solidifying is performed by what is called a rapid solidification, such as strip casting or jet casting wherein the alloy melt is continuously supplied onto a rotating, water-cooled copper roll for solidification, or gas atomizing wherein the alloy melt is sprayed in a pressurized inert gas flow for solidification, the subsequent heat treatment may not be required, depending on the alloy composition. After these treatments, a suitable crushing step may be carried out depending on the use of the alloy, and the objective Cr—Ti—V hydrogen storage alloy is obtained.

According to the present invention, an alloy having a melting point of not higher than 1600° C. may be produced easily utilizing thermit reduction, and thus the obtained alloy may be remelted in a large-scale furnace, such as a high frequency induction furnace, for purifying and casting in a subsequent step, without remarkably wearing the crucible, which is advantageous for production in an industrial scale. Further, the hydrogen storage alloy obtained by the method contains only a little Al and inclusion, which have adverse effects on the hydrogen storage capacity. Thus the alloy has a high effective hydrogen storage capacity, and is therefore useful for storage and transportation of hydrogen, anodes for rechargeable batteries, or heat pumps.

EXAMPLES

The present invention will now be explained with reference to Examples and Comparative Examples, but the present invention is not limited thereto.

Example 1-1

A thermit reduction equipment was provided including a crucible having an inside dimension of 250φ×400 mm, made of magnesia bricks and lined with magnesia. As the alloy materials, there were provided a Cr oxide containing 99 wt % $Cr_2O_3$, a V oxide containing 93 wt % $V_2O_5$, and metal Al, each crushed into particles of not larger than 8 mm, and sponge Ti having a particle size of about 5 mm. 3.6 kg of the sponge Ti was placed on the bottom of the crucible as the alloy material (2). Above the alloy material (2), a low carbon steel plate of 0.1 mm thick was disposed as a separation layer, on which the alloy material (1) was placed, containing 8.6 kg of the Cr oxide, 2.8 kg of the V oxide, and 5.0 kg of the metal Al. Then the alloy material (1) was ignited on top to initiate thermit reaction, and after 2 hours, the crucible was inverted and the alloy was recovered. The chemical composition of the alloy is shown in Table 1.

Next, the alloy was remelted in a magnesia crucible by means of a high frequency induction furnace. Upon melting, 1 at % of bulk metal La was added as an oxidizing agent. The alloy melt was held at 1620° C. for 5 minutes, finally heated to 1650° C., and cast in a copper mold having an inside dimension of 15×200×200 mm. The obtained alloy ingot was crushed into pieces having an average size of about 10×10×10 mm, heat-treated in an argon gas atmosphere at 1400° C. for 10 minutes, and rapidly cooled into water. The resulting alloy pieces were crushed in a stamp mill into particles having an average particle size of about 1 mm. The oxygen content and the effective hydrogen storage capacity of the alloy particles were measured. The effective hydrogen storage capacity was measured by Sieverts method using a PCT measuring apparatus manufactured by SUZUKI SHOKAN CO., LTD., wherein hydrogen absorption and desorption were repeated at a constant temperature of 40° C. in the hydrogen pressure range of 0.01 to 4 MPa to draw a PCT curve, and the capacity at the third cycle on the PCT curve was taken as the effective hydrogen storage capacity. The results are shown in Table 2.

Comparative Example 1-1

An alloy was prepared in the same way as in Example 1-1, except that the alloy materials (1) and (2) were not separated but mixed together, and placed in the crucible without the separation layer. The chemical composition of the alloy after the thermit reduction is shown in Table 1, and the oxygen content and the effective hydrogen storage capacity of the alloy after the deoxidization are shown in Table 2.

Example 1-2

On the bottom of a crucible similar to the one used in Example 1-1, 3.3 kg of sponge Ti having a particle size of about 5 mm was placed as the alloy material (2). On top of the alloy material (2) was placed a 0.3 mm thick low carbon steel plate in a dish shape, on which the alloy material (1) was placed, containing 8.7 kg of a Cr oxide containing 95 wt % $Cr_2O_3$, 3.1 kg of a V oxide containing 95 wt % $V_2O_5$, and 4.0 kg of metal Al, each crushed into particles of not larger than 8 mm and mixed. The alloy material (1) was ignited on top to initiate thermit reaction, and after 2 hours, the crucible was inverted and the alloy was recovered. The chemical composition of the alloy is shown in Table 1.

Next, the alloy was remelted in a magnesia crucible by means of a high frequency induction furnace. Upon melting, 1.5 at % of bulk metal La was added as an oxidizing agent. The alloy melt was held at 1620° C. for 5 minutes, finally heated to 1650° C., and poured onto a water-cooled copper roll of a strip casting apparatus rotating at a peripheral velocity of 1.5 m/s to produce ribbons of 0.7 to 1 mm thick.

The obtained alloy ribbons were heat-treated in an argon gas atmosphere at 1400° C. for 5 minutes, and rapidly cooled into water. The resulting alloy ribbons were measured of the oxygen content and the effective hydrogen storage capacity in the same way as in Example 1-1. The results are shown in Table 2.

Comparative Example 1-2

An alloy was prepared in the same way as in Example 2-1, except that the alloy materials (1) and (2) were not separated but mixed together, and placed in the crucible without the separation layer. The chemical composition of the alloy after the thermit reduction is shown in Table 1, and the oxygen content and the effective hydrogen storage capacity of the alloy after the deoxidization are shown in Table 2.

Example 1-3

On the bottom of a crucible similar to the one used in Example 1-1, 3.3 kg of sponge Ti having a particle size of about 5 mm was placed as the alloy material (2). On top of the alloy material (2) was laid magnesia in 5 mm thick, on which the alloy material (1) was placed, containing 8.7 kg of a Cr oxide containing 95 wt % $Cr_2O_3$, 3.1 kg of a V oxide containing 95 wt % $V_2O_5$, and 4.0 kg of metal Al, each crushed into particles of not larger than 8 mm and mixed. The alloy material (1) was ignited on top to initiate thermit reaction, and after 2 hours, the crucible was inverted and the alloy was recovered. The chemical composition of the alloy is shown in Table 1.

Next, the alloy was remelted in a magnesia crucible by means of a high frequency induction furnace. Upon melting, 1.5 at % of bulk metal La was added as an oxidizing agent. The alloy melt was heated to 1650° C., and poured onto a water-cooled copper roll of a strip casting apparatus rotating at a peripheral velocity of 1 m/s to produce ribbons of about 1 mm thick. The obtained alloy ribbons were heat-treated in an argon gas atmosphere at 1400° C. for 5 minutes, and rapidly cooled into water. The resulting alloy ribbons were measured of the oxygen content and the effective hydrogen storage capacity in the same way as in Example 1-1. The results are shown in Table 2.

From the results shown in Tables 1 and 2, it is understood that the alloys of Examples have the Al content and the oxygen content originating from the inclusion both lower than those of Comparative Examples, and the effective hydrogen storage capacity of not lower than 2 wt %, exhibiting excellent properties. In the methods of Comparative Examples, the Ti content was remarkably lowered possibly because Ti was consumed in reduction of other oxides or in reaction with the crucible, and it was thus difficult to obtain alloys of the objective composition.

Example 2-1

A thermit reduction equipment was provided including a crucible having an inside dimension of 250φ×400 mm, made of magnesia bricks and lined with magnesia. As the alloy materials, there were provided a Cr oxide containing 99 wt % $Cr_2O_3$, a V oxide containing 93 wt % $V_2O_5$, and metal Al, each crushed into particles of not larger than 8 mm, and sponge Ti having a particle size of about 5 mm. 3.4 kg of the sponge Ti was placed on the bottom of the crucible as the alloy material (2). Above the alloy material (2), a separator plate was disposed including a sliding nozzle having a magnesia brick with an orifice of 27×27 mm incorporated therein. On the separator plate, the alloy material (1) was placed, containing 9.0 kg of the Cr oxide, 3.0 kg of the V oxide, 3.8 kg of the metal Al (80% of the theoretical amount for reducing the Cr oxide and the V oxide), 1.2 kg of potassium chlorate (manufactured by ARAGONESAS SA, 99.8% purity), and 530 g of the metal Al as a reducing agent for the potassium chlorate.

Then, with an argon gas blown into the compartment containing the alloy material (2), the alloy material (1) was ignited on top to initiate thermit reaction. When the alloy material (1) was melted, the sliding nozzle was slid to pour the melt of the alloy material (1) onto the alloy material (2) through the nozzle gate. After 2 hours, the crucible containing the alloy material (2) was inverted to recover the alloy melt, and the alloy was obtained. The chemical composition of the alloy was measured. The results are shown in Table 3.

Next, the alloy was remleted in a magnesia crucible by means of a high frequency induction furnace. Upon melting,

TABLE 1

|  | Cr (at %) | Ti (at %) | V (at %) | Al (at %) | Fe (at %) | O (wt %) | N (wt %) |
| --- | --- | --- | --- | --- | --- | --- | --- |
| Example 1-1 | 52.5 | 31.2 | 15.0 | 0.5 | 0.34 | 0.5 | 0.03 |
| Comp. Ex. 1-1 | 54.3 | 25.8 | 13.7 | 5.1 | 0.32 | 0.8 | 0.04 |
| Example 1-2 | 51.0 | 32.8 | 14.9 | 0.4 | 0.31 | 0.6 | 0.03 |
| Comp. Ex. 1-2 | 53.3 | 27.0 | 14.2 | 4.3 | 0.30 | 0.9 | 0.09 |
| Example 1-3 | 51.5 | 31.9 | 15.0 | 0.3 | 0.10 | 0.6 | 0.03 |

TABLE 2

|  | O (wt %) | Effective Hydrogen Storage Capacity (wt %) |
| --- | --- | --- |
| Example 1-1 | 0.04 | 2.2 |
| Comp. Ex. 1-1 | 0.05 | 1.3 |
| Example 1-2 | 0.04 | 2.0 |
| Comp. Ex. 1-2 | 0.05 | 1.4 |
| Example 1-3 | 0.04 | 2.1 |

2 at % of bulk metal La was added as an oxidizing agent. The alloy melt was held at 1620° C. for 5 minutes, finally heated to 1650° C., and cast in a copper mold having an inside dimension of 15×200×200 mm. The obtained alloy ingot was crushed into pieces having an average size of about 10×10×10 mm, heat-treated in an argon gas atmosphere at 1300° C. for 10 minutes, and rapidly cooled into water. The resulting alloy pieces were crushed in a stamp mill into particles having an average particle size of about 1 mm. The oxygen content and the effective hydrogen storage capacity of the alloy particles were measured in the same way as in Example 1-1. Th results are shown in Table 4.

Comparative Example 2-1

A Cr—Ti—V alloy was prepared in the same way as in Example 2-1, except that 3.8 kg of the metal Al (80% of the theoretical amount) for reducing the Cr oxide and the V oxide was replaced with 4.8 kg of metal Al, which is the theoretical amount (100%) required for reducing the Cr oxide and the V oxide, the separator plate having the sliding nozzle was not used, the alloy materials (1) and (2) were not separated but mixed together, and the mixed alloy material was ignited on top to initiate thermit reaction. The chemical composition of the alloy after the thermit reduction is shown in Table 3, and the oxygen content and the effective hydrogen storage capacity of the alloy after the deoxidization are shown in Table 4.

Example 2-2

On the bottom of a crucible similar to the one used in Example 2-1, 3.3 kg of sponge Ti having a particle size of about 5 mm was placed as the alloy material (2). Above the alloy material (2), a separator plate similar to the one used in Example 2-1 was disposed, on which the alloy material (1) was placed, containing 8.7 kg of a Cr oxide containing 93 wt % $Cr_2O_3$, 3.1 kg of a V oxide containing 95 wt % $V_2O_5$, 3.6 kg of metal Al (78% of the theoretical amount for reducing the Cr oxide and the V oxide), 0.9 kg of potassium chlorate, and 400 g of metal Al as a reducing agent for the potassium chlorate. Then thermit reaction was initiated in the same way as in Example 2-1, and the resulting alloy was recovered. The chemical composition of the alloy is shown in Table 3.

Next, the alloy was remelted in an yttria crucible by means of a high frequency induction furnace. After the remelting, 1.5 at % of bulk metal La was added to the alloy melt as an oxidizing agent. The alloy melt was held at 1620° C. for 5 minutes, finally heated to 1650° C., and poured onto a water-cooled copper roll of a strip casting apparatus rotating at a peripheral velocity of 1 m/s to produce ribbons of about 0.7 to 1 mm thick. The obtained alloy ribbons were heat-treated in an argon gas atmosphere at 1400° C. for 10 minutes, and rapidly cooled into water. The resulting alloy ribbons were measured of the oxygen content and the effective hydrogen storage capacity in the same way as in Example 2-1. The results are shown in Table 4.

Comparative Example 2-2

A Cr—Ti—V alloy was prepared in the same way as in Example 2-2, except that the separator plate having the sliding nozzle was not used, the alloy materials (1) and (2) as in Example 2-1 were not separated but mixed together, and the mixed alloy material was ignited on top to initiate thermit reaction. The chemical composition of the alloy after the thermit reduction is shown in Table 3, and the oxygen content and the effective hydrogen storage capacity of the alloy after the deoxidization are shown in Table 4.

Example 2-3

On the bottom of a crucible similar to the one used in Example 2-1, 3.3 kg of sponge Ti having a particle size of about 5 mm as the alloy material (2), and 0.45 kg of electrolytic Ni crushed into particles of not larger than 8 mm, were placed. Above the alloy material (2) and the electrolytic Ni, a separator plate similar to the one in Example 2-1 was disposed, on which the alloy material (1) was placed, containing 6.2 kg of a Cr oxide containing 96 wt % $Cr_2O_3$, 2.5 kg of a V oxide containing 95 wt % $V_2O_5$, 2.9 kg of metal Al (88% of the theoretical amount for reducing the Cr oxide and the V oxide), 1.05 kg of potassium chlorate, and 460 g of metal Al as a reducing agent for the potassium chlorate. Then thermit reaction was initiated in the same way as in Example 2-1, and the resulting alloy was recovered. The chemical composition of the alloy is shown in Table 3.

Next, the alloy was cleaned of the slag deposited on its surface, and remelted in an yttria crucible by means of a high frequency induction furnace. After the remelting, 5 wt % (about 1.8 at %) of Mm (mixed rare earths including about 25 wt % La, about 51 wt % Ce, about 6 wt % Pr, and about 18 wt % Nd) in the shape of a rod of about 10 mmφ×10 mm was added to the alloy melt as an oxidizing agent. The alloy melt was heated to 1650° C., and poured onto a water-cooled copper roll of a strip casting apparatus rotating at a peripheral velocity of 1.5 m/s to produce alloy ribbons. The obtained alloy ribbons were heat-treated in an argon gas atmosphere at 1250° C. for 10 minutes, and rapidly cooled into water. The resulting alloy ribbons were measured of the oxygen content and the effective hydrogen storage capacity in the same way as in Example 2-1. The results are shown in Table 4.

Comparative Example 2-3

A Cr—Ti—V—Ni alloy was prepared in the same way as in Example 2-3, except that the separator plate having the sliding nozzle was not used, the alloy materials (1) and (2) as in Example 2-3 were not separated but mixed together, and the mixed alloy material was ignited to initiate thermit reaction. The chemical composition of the alloy after the thermit reduction is shown in Table 3, and the oxygen content and the effective hydrogen storage capacity of the alloy after the deoxidization are shown in Table 4.

TABLE 3

|  | Cr (at %) | Ti (at %) | V (at %) | Ni (at %) | Al (at %) | O (wt %) | N (wt %) |
| --- | --- | --- | --- | --- | --- | --- | --- |
| Example 2-1 | 52.0 | 32.5 | 14.5 | — | 0.6 | 1.2 | 0.03 |
| Comp. Ex. 2-1 | 53.5 | 27.6 | 14.0 | — | 4.5 | 0.8 | 0.04 |
| Example 2-2 | 52.3 | 32.1 | 15.0 | — | 0.4 | 0.7 | 0.03 |
| Comp. Ex. 2-2 | 53.0 | 27.0 | 14.0 | — | 4.0 | 0.9 | 0.05 |
| Example 2-3 | 42.9 | 36.5 | 15.0 | 4.6 | 0.75 | 1.10 | 0.03 |
| Comp. Ex. 2-3 | 42.8 | 30.5 | 15.5 | 5.2 | 1.85 | 0.9 | 0.04 |

TABLE 4

|  | O (wt %) | Effective Hydrogen Storage Capacity (wt %) |
| --- | --- | --- |
| Example 2-1 | 0.04 | 2.1 |
| Comp. Ex. 2-1 | 0.05 | 1.3 |
| Example 2-2 | 0.04 | 2.1 |
| Comp. Ex. 2-2 | 0.05 | 1.4 |
| Example 2-3 | 0.04 | 2.0 |
| Comp. Ex. 2-3 | 0.05 | 1.4 |

From the results shown in Tables 3 and 4, it is understood that the alloys of Examples have the Al content and the oxygen content originating from the inclusion both lower than those of Comparative Examples, and the effective hydrogen storage capacity of not lower than 2 wt %, exhibiting excellent properties. In the methods of Comparative Examples, the Ti content was remarkably lowered possibly because Ti was consumed in reduction of other oxides or in reaction with the crucible, and it was thus difficult to obtain alloys of the objective composition.

What is claimed is:

1. A method for producing a Cr—Ti—V hydrogen storage alloy utilizing thermit process, metal elements in said Cr—Ti—V hydrogen storage alloy consisting essentially of Cr, V, Al, Ti and a rare earth metal selected from the group consisting of La, Ce, and misch metal, and said alloy having a body-centered cubic (BCC) crystal structure, said method comprising:

material preparation step (A) of providing an alloy material (1) comprising a Cr oxide, a V oxide, and a reducing agent Al, and an alloy material (2) comprising Ti;

material introduction step (B) of placing said alloy materials in a crucible for thermit reduction so that the alloy material (1) is placed above the alloy material (2);

metal melting step (C) of igniting the alloy material (1) placed in the crucible in step (B) for thermit reaction and melting all metal elements contained in the alloy materials with heat of the thermit reaction of the alloy material (1) to obtain an alloy melt wherein its metal elements consist essentially of Cr, V, Al, and Ti;

step (D) of making said alloy melt obtained in step (C) into an alloy; and step (E) of melting said alloy obtained in step (D) with a rare earth metal selected from the group consisting of La, Ce, and misch metal in an amount of not less than 0.2 at % of said alloy to obtain an alloy melt, deoxidizing said alloy melt to lower its oxygen content to not higher than 0.1 wt %, and cooling and solidifying said deoxidized alloy melt to obtain a Cr—Ti—V hydrogen storage alloy.

2. The method of claim 1, wherein said alloy material (1) further comprises an oxidizing agent for providing additional heat by thermit reaction, and wherein a content of said Al is a sum of 70 to 90% of a theoretical Al amount required for reducing the Cr oxide and the V oxide, and an amount required for reducing said oxidizing agent.

3. The method of claim 2, wherein said oxidizing agent is selected from the group consisting of barium peroxide, potassium chlorate, sodium chlorate, and mixtures thereof.

4. The method of claim 1, wherein said crucible for thermit reduction comprises a separator plate having a sliding nozzle, said separator plate being capable of separating an interior of said crucible into at least upper and lower compartments, and wherein in placing the alloy materials (1) and (2) in the crucible in said step (B), the alloy materials (1) and (2) are arranged separated by said separator plate.

5. The method of claim 1, wherein said alloy materials (1) and (2) are provided so that a resulting Cr—Ti—V hydrogen storage alloy contains 25 to 70 at % Cr, 15 to 45 at % Ti, 5 to 45 at % V, and 0.01 to 2 at % Al, and has a melting point not higher than 1600° C.

6. A method for producing a Cr—Ti—V hydrogen storage alloy utilizing thermit process, metal elements in said Cr—Ti—V hydrogen storage alloy consisting essentially of Cr, V, Al, Ti, an auxiliary component selected from the group consisting of Fe, Mn, Mo, Ni, Co, and mixtures thereof, and a rare earth metal selected from the group consisting of La, Ce, and misch metal, and said alloy having a body-centered cubic (BCC) crystal structure, said method comprising:

material preparation step (A) of providing an alloy material (1) comprising a Cr oxide, a V oxide, and a reducing agent Al, and an alloy material (2) comprising Ti;

material introduction step (B) of placing said alloy materials in a crucible for thermit reduction with a separation layer provided between the alloy materials (1) and (2) so that the alloy material (1) is placed above the alloy material (2), wherein said separation layer is selected from the group consisting of an iron plate, a steel plate, and an alloy steel plate, and has a melting point higher than that of Al;

metal melting step (C) of igniting the alloy material (1) placed in the crucible in step (B) for thermit reaction and melting all metal elements contained in the alloy materials with heat of the thermit reaction of the alloy material (1) to obtain an alloy melt wherein its metal elements consist essentially of Cr, V, Al, Ti, and said auxiliary component;

step (D) of making said alloy melt obtained in step (C) into an alloy; and step (E) of melting said alloy obtained in step (D) with a rare earth metal selected from the group consisting of La, Ce, and misch metal in an amount of not less than 0.2 at % of said alloy to obtain an alloy melt, deoxidizing said alloy melt to lower its oxygen content to not higher than 0.1 wt %, and cooling and solidifying said deoxidized alloy melt to obtain a Cr—Ti—V hydrogen storage alloy.

7. The method of claim 6, wherein said alloy material (1) further comprises an oxidizing agent for providing additional heat by thermit reaction, and wherein a content of said Al is a sum of 70 to 90% of a theoretical Al amount required for reducing the Cr oxide and the V oxide, and an amount required for reducing said oxidizing agent.

8. The method of claim 7, wherein said oxidizing agent is selected from the group consisting of barium peroxide, potassium chlorate, sodium chlorate, and mixtures thereof.

9. The method of claim 6, wherein said separation layer is 0.05 to 3.0 mm thick.

10. The method of claim 6, wherein said separation layer contains an auxiliary component selected from the group consisting of Fe, Mn, Mo, Ni, Co, and mixtures thereof.

11. The method of claim 6, wherein said alloy materials (1) and (2) are provided so that a resulting Cr—Ti—V hydrogen storage alloy contains 25 to 70 at % Cr, 15 to 45 at % Ti, 5 to 45 at % V, and 0.01 to 2 at % Al, and has a melting point not higher than 1600° C.

12. A method for producing a Cr—Ti—V hydrogen storage alloy utilizing thermit process, metal elements in said Cr—Ti—V hydrogen storage alloy consisting essentially of Cr, V, Al, Ti, an auxiliary component selected from the group consisting of Fe, Mn, Mo, Ni, Co, and mixtures thereof, and a rare earth metal selected from the group consisting of La, Ce, and misch metal, and said alloy having a body-centered cubic (BCC) crystal structure, said method comprising:

material preparation step (A) of providing an alloy material (1) comprising a Cr oxide, a V oxide, and a reducing agent Al, and an alloy material (2) comprising Ti, at least one of said alloy materials (1) and (2) further comprising an auxiliary component selected from the group consisting of Fe, Mn, Mo, Ni, Co, and mixtures thereof;

material introduction step (B) of placing said alloy materials in a crucible for thermit reduction so that the alloy material (1) is placed above the alloy material (2);

metal melting step (C) of igniting the alloy material (1) placed in the crucible in step (B) for thermit reaction and melting all metal elements contained in the alloy materials with heat of the thermit reaction of the alloy material (1) to obtain an alloy melt wherein its metal elements consist essentially of Cr, V, Al, Ti, and said auxiliary component;

step (D) of making said alloy melt obtained in step (C) into an alloy; and step (E) of melting said alloy obtained in step (D) with a rare earth metal selected from the group consisting of La, Ce, and misch metal in an amount of not less than 0.2 at % of said alloy to obtain an alloy melt, deoxidizing said alloy melt to lower its oxygen content to not higher than 0.1 wt %, and cooling and solidifying said deoxidized alloy melt to obtain a Cr—Ti—V hydrogen storage alloy.

13. The method of claim 12, wherein said alloy material (1) further comprises an oxidizing agent for providing additional heat by thermit reaction, and wherein a content of said Al is a sum of 70 to 90% of a theoretical Al amount required for reducing the Cr oxide and the V oxide, and an amount required for reducing said oxidizing agent.

14. The method of claim 13, wherein said oxidizing agent is selected from the group consisting of barium peroxide, potassium chlorate, sodium chlorate, and mixtures thereof.

15. The method of claim 12, wherein in said step (B), a separation layer having a melting point higher than that of Al is provided between the alloy materials (1) and (2).

16. The method of claim 15, wherein said separation layer is selected from the group consisting of an iron plate, a steel plate, and an alloy steel plate, each of 0.05 to 3.0 mm thick.

17. The method of claim 16, wherein said separation layer contains an auxiliary component selected from the group consisting of Fe, Mn, Mo, Ni, Co, and mixtures thereof.

18. The method of claim 12, wherein said crucible for thermit reduction comprises a separator plate having a sliding nozzle, said separator plate being capable of separating an interior of said crucible into at least upper and lower compartments, and wherein in placing the alloy materials (1) and (2) in the crucible in said step (B), the alloy materials (1) and (2) are arranged separated by said separator plate.

19. The method of claim 12, wherein said alloy materials (1) and (2) are provided so that a resulting Cr—Ti—V hydrogen storage alloy contains 25 to 70 at % Cr, 15 to 45 at % Ti, 5 to 45 at % V, and 0.01 to 2 at % Al, and has a melting point not higher than 1600° C.

* * * * *

UNITED STATES PATENT AND TRADEMARK OFFICE
CERTIFICATE OF CORRECTION

PATENT NO. : 7,175,721 B2 Page 1 of 1
APPLICATION NO. : 10/476070
DATED : February 13, 2007
INVENTOR(S) : Hiroaki Takata et al.

It is certified that error appears in the above-identified patent and that said Letters Patent is hereby corrected as shown below:

On the title page item (54), and Col. 1, line 1,

Delete "METHOD FOR PREPARING CR-TI-V TYPE HYDROGEN OCCLUSION ALLOY" and insert -- METHOD FOR PRODUCING Cr=Ti=V HYDROGEN STORAGE ALLOYS-- therefor.

Signed and Sealed this

Tenth Day of April, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,175,721 B2 | Page 1 of 1 |
| APPLICATION NO. | : 10/476070 | |
| DATED | : February 13, 2007 | |
| INVENTOR(S) | : Hiroaki Takata et al. | |

It is certified that error appears in the above-identified patent and that said Letters Patent is hereby corrected as shown below:

On the title page item (54), and Col. 1, line 1,

Delete "METHOD FOR PREPARING CR-TI-V TYPE HYDROGEN OCCLUSION ALLOY" and insert -- METHOD FOR PRODUCING Cr-Ti-V HYDROGEN STORAGE ALLOYS-- therefor.

This certificate supersedes Certificate of Correction issued April 10, 2007.

Signed and Sealed this

Fourth Day of December, 2007

JON W. DUDAS
*Director of the United States Patent and Trademark Office*